United States Patent
Sanada et al.

(10) Patent No.: US 6,348,426 B1
(45) Date of Patent: Feb. 19, 2002

(54) ELECTRICALLY CONDUCTIVE COMPOSITION, CERAMIC ELECTRONIC COMPONENT, AND METHOD FOR PRODUCING THE COMPONENT

(75) Inventors: Yukio Sanada, Fukui; Shinichiro Kuroiwa, Takefu; Kyoumi Tsukida, Fukui-ken, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/396,616

(22) Filed: Sep. 15, 1999

(30) Foreign Application Priority Data

Sep. 24, 1998 (JP) .......................................... 10-269633

(51) Int. Cl.⁷ ................................................. C03C 8/18
(52) U.S. Cl. ............................ 501/19; 501/16; 501/15; 501/20; 501/26; 428/689; 428/701; 428/702; 428/704; 427/58
(58) Field of Search ............................. 501/16, 19, 26, 501/20, 15; 428/688, 689, 701, 702, 704; 427/58

(56) References Cited

U.S. PATENT DOCUMENTS 5,302,557 A * 4/1994 Carroll et al.

* cited by examiner

Primary Examiner—Deborah Jones
Assistant Examiner—Wendy Boss
(74) Attorney, Agent, or Firm—Ostrolenk, Faber, Gerb & Soffen, LLP

(57) ABSTRACT

An electrically conductive composition for forming an electrically conductive film through firing. The composition includes metal powder and glass frit as solid components. The glass frit contains a first glass frit which assumes a molten state at least at the maximum temperature during firing and a second glass frit which maintains a glass-ceramic state at the maximum temperature during firing. The first frit has a softening point 100° C. or more lower than the maximum temperature during firing. The content of the first glass frit based on the total amount of glass frit lies within the range of about 25–90 wt. %, and the total amount of glass frit based on the total solid component including metal powder lies within a range of about 3–10 wt. %. Also disclosed are ceramic electronic components and a production process of the components.

15 Claims, No Drawings

ELECTRICALLY CONDUCTIVE COMPOSITION, CERAMIC ELECTRONIC COMPONENT, AND METHOD FOR PRODUCING THE COMPONENT

BACKGROUND OF THE INVENTION

1 Field of the Invention

The present invention relates to an electrically conductive composition, a ceramic electronic component, and a method for producing the component, and more particularly, to an electrically conductive composition for forming a conductive film on an outer surface of a ceramic electronic component through firing; a ceramic electronic component produced by use of the conductive composition; and a method for producing the component.

2. Description of the Related Art

Generally, an electrically conductive paste comprising solid components such as metal powder and glass frit and vehicle components such as a binder which provides appropriate viscosity and coatability and a solvent is employed as an electrically conductive composition so as to form an electrically conductive film on an outer surface of a ceramic electronic component, such as an outer metallized portion of a monolithic ceramic capacitor. Thus, an electrically conductive film is formed by provision of the electrically conductive paste on a target area of an outer surface of the body of an electronic component and firing.

In the case of a monolithic ceramic electronic component such as a monolithic ceramic capacitor, the body of the electronic component on which the electrically conductive film is formed includes an internal conductor formed therein and partially exposed so as to be able to establish electric contact with the electrically conductive film. Therefore, the electrically conductive paste is provided so as to make contact with the internal conductor and firing is performed to thereby establish electric contact between the internal conductor and metal contained in the conductive paste.

The use of glass frit in such an electrically conductive composition, e.g., a conductive paste, is herein divided into two cases. In a first case, there is employed a glass frit having a comparatively low softening point such that the frit assumes a molten state at least at the maximum temperature during firing. In a second case, there is employed glass frit having a comparatively high softening point such that the frit maintains a glass-ceramic state at the maximum temperature during firing.

In the first case in which there is employed glass frit having a comparatively low softening point, the glass component is softened at a comparatively early stage of the firing step. Therefore, even when an internal conductor is made of a base metal such as nickel, the metal contained in the electrically conductive composition and the internal conductor form an alloy, to thereby establish excellent electric contact between the conductive film made from the composition and the internal conductor, the base metal is oxidized.

When the maximum temperature during firing of the electrically conductive composition increases, the glass component exudes from the conductive film to the surface thereof. Therefore, when the conductive film is surface treatment plated, uniform adhesion of plating layer may be disturbed.

In contrast, when the maximum temperature during firing decreases, sintering of metal powder contained in the conductive composition proceeds insufficiently to thereby possibly provide a porous sintered product. Thus, during the plating treatment as described above, the plating solution might intrude into the ceramic body of the electronic component to thereby possibly cause degradation of electrical properties such as insulation resistance.

In the above-described second case in which there is employed a glass frit maintaining a glass-ceramic state at the maximum temperature during firing, the glass component does not melt during firing. Thus, good electric contact between an internal conductor and a metal contained in the electrically conductive composition might not be attained unless the internal conductor is sufficiently exposed— through a treatment such as polishing of the body of the electronic component—before provision of the electrically conductive composition.

When an internal conductor contains a base metal, good electric contact between the internal conductor and a metal contained in the electrically conductive composition might be more difficult to attain since the internal conductor may be oxidized while the glass component contained in the conductive composition does not melt during the firing step.

SUMMARY OF THE INVENTION

To overcome the above described problems, the present invention provides an electrically conductive composition for forming an electrically conductive film through firing which comprises metal powder and glass frit as solid components, wherein the glass frit comprises first glass frit which assumes a molten state at least at the maximum temperature during firing and second glass frit which maintains a glass-ceramic state at the maximum temperature during firing.

One preferred embodiment of the present invention provides an electrically conductive composition for forming an electrically conductive film through firing comprising: metal powder and glass frit as solid components, wherein the glass frit comprises a first glass frit which assumes a molten state at least at the maximum temperature during firing and a second glass frit which maintains a glass-ceramic state at the maximum temperature during firing; the first frit has a softening point about 100° C. or more lower than the maximum temperature during firing; the content of the first glass frit based on the total amount of the glass frit lies within a range of about 25–90 wt. %; and the total amount of the glass frit based on the total solid component including the metal powder lies within the range of about 3–10 wt. %.

In the above described electrically conductive composition, the metal powder is preferably at least one selected from the group consisting of copper and silver.

Another preferred embodiment of the present invention provides a ceramic electronic component comprising an electronic component body and an electrically conductive film disposed on an outer surface of the body through firing, wherein the electrically conductive film comprises a sintered product which contains metal and glass; the glass comprises a first glass which assumes a molten state at least at the maximum temperature during firing and a second glass which maintains a glass-ceramic state at the maximum temperature during firing; the first glass having a softening point about 100° C. or more lower than the maximum temperature during firing; the content of the first glass based on the total amount of the glass lies within the range of about 25–90 wt. %; and the total amount of the glass in the conductive film lies within the range of about 3–10 wt. %.

In the above described ceramic electronic component, the metal powder is preferably at least one selected from the group consisting of copper and silver. Also, an internal conductor may be disposed in the electronic component body and electrically connected to the conductive film. Further, the internal conductor may comprise a base metal.

Yet another preferred embodiment of the present invention provides a method for producing a ceramic electronic component having an electronic component body and an electrically conductive film disposed on an outer surface of the body through firing, the method comprising the steps of providing the electronic component body; providing the electrically conductive composition as described above for forming a conductive film; disposing the electrically conductive composition on an outer surface of the electronic component body; and firing the conductive composition such that the maximum temperature during firing is about 100° C. or more higher than the softening point of the first glass frit and the second glass frit maintains a glass-ceramic state at the maximum temperature during firing.

In the above described method, an internal conductor may be disposed in the electronic component body and partially exposed so as to be electrically connected to the electrically conductive film; and the step of disposing the electrically conductive composition includes a step of providing the electrically conductive composition so that the electrically conductive composition contacts the internal conductor. Further, the internal conductor may comprise a base metal.

DESCRIPTION OF PREFERRED EMBODIMENTS

EXAMPLE 1

A glass frit formed of Zn—B—Si glass and glass frit formed of Si—B glass were mixed at a variety of mixing ratios as shown in Table 1.

TABLE 1

| Sample No. | 1 | 2 | 3 | 4 | 5 | 6 |
|---|---|---|---|---|---|---|
| Zn—B—Si Glass (wt. %) | 100 | 90 | 75 | 50 | 25 | 0 |
| Si—B Glass (wt. %) | 0 | 10 | 25 | 50 | 75 | 100 |

The Zn—B—Si glass in Table 1 has a softening point of 600° C. and the Si—B glass in Table 1 assumes a glass-ceramic state within a temperature range of 450–850° C.

By use of each of the glass frit samples shown in Table 1, electrically conductive pastes serving as an electrically conductive composition were prepared. Specifically, mixtures comprising the respective glass frit samples (5 wt. %) and copper powder (75 wt. %) serving as a solid component, and an organic vehicle (20 wt. %) were kneaded by use of a three-roll mill to thereby produce an electrically conductive paste.

The thus-obtained conductive paste was applied to an outer surface of the body of a monolithic ceramic capacitor which has planar dimensions of 2.0 mm×1.2 mm and a specified electrostatic capacity of 1 mF and which contains an internal conductor made of nickel, and then fired to thereby form a conductive film serving as an outer metallized portion. The firing step was carried out in a nitrogen atmosphere (oxygen concentration of 50 ppm) while a maximum temperature of 800° C. was maintained for five minutes.

After formation of the outer metallized portion through firing, the surface thereof was successively plated with nickel to a thickness of 1 mm and with tin to a thickness of 2 mm.

The thus-obtained monolithic ceramic capacitors made from the respective samples were subjected to measurement of electrostatic capacity and evaluation of resistance to moisture-loading and adhesion of plating. In the moisture-loading test, 1 WV was applied to each capacitor for 1000 hours at 85° C. under a relative humidity of 85%, and insulation resistance was then measured. For 100 pieces of samples, the number of samples which showed lowered insulation resistance was counted. The adhesion of plating was evaluated in terms of an area ratio of adhered plating; i.e., a ratio of area of adhered plating to the entire area of the outer metallized portion. The results are shown in Table 2.

TABLE 2

| Sample No. | | 1 | 2 | 3 | 4 | 5 | 6 |
|---|---|---|---|---|---|---|---|
| Electrostatic capacity (nF) n = 50 | Average | 993 | 1001 | 997 | 1006 | 1002 | 975 |
| | Maximum | 1051 | 1054 | 1034 | 1025 | 1056 | 1012 |
| | Minimum | 967 | 978 | 954 | 967 | 978 | 758 |
| Moisture-loading test, number showing IR decrease per 100 samples | | 3 | 0 | 0 | 0 | 0 | 0 |
| Area ratio of plating adhesion | | 100% | 100% | 100% | 100% | 100% | 95% |

As is clear from Table 2, Sample Nos. 2 to 5, which contain Zn—B—Si glass frit in an amount of about 25–90 wt. % based on the total amount of glass frit almost attained the target electrostatic capacity; showed no decrease of insulation resistance in the moisture-loading test; and attained an area ratio of plating adhesion of 100%. Thus, excellent electric contact between the outer metallized portion and the internal conductor was attained. In addition, no substantial permeation of a plating solution through the outer metallized portion occurred and thereby plating adhesion was excellent.

In contrast, Sample No. 1, which contains Zn—B—Si glass frit in an amount in excess of 90 wt. % based on the total amount of glass frit, showed a tendency toward decrease of insulation resistance in the moisture-loading test.

Sample No. 6, which contains Zn—B—Si glass frit in an amount of less than 25 wt. % based on the total amount of glass frit, showed a tendency to deteriorate plating adhesion.

EXAMPLE 2

The following experiment was carried out in order to determine a preferable content of glass frit in a solid component containing metal powder and glass frit, of an electrically conductive composition.

At first, there were provided glass frit formed of the Zn—B—Si glass having a softening point of 600° C. as used in Example 1 and glass frit formed of Si—B glass assuming a glass-ceramic state within the range of 550–1000° C.

The above two types of glass frit samples were mixed in equal amounts; i.e., 50 wt. % each, to thereby provide mixed glass frit. As shown in Table 3, the glass frit and copper powder were mixed at a variety of mixing proportions to thereby provide solid mixtures. The respective mixtures (80 wt. %) and an organic vehicle (20 wt. %) were mixed in the manner described in Example 1 to thereby produce an electrically conductive paste serving as an electrically conductive composition.

TABLE 3

| Sample No. | 11 | 12 | 13 | 14 | 15 |
|---|---|---|---|---|---|
| Glass (wt. %) | 2 | 3 | 5 | 10 | 12 |
| Copper powder (wt. %) | 98 | 97 | 95 | 90 | 88 |

Subsequently, application of the paste, firing and plating were carried out in the manner described in Example 1 to thereby produce a similar monolithic ceramic capacitor.

The characteristics of the thus-obtained monolithic ceramic capacitors made of each sample were evaluated in a manner similar to that described in Example 1. The results are shown in Table 4.

TABLE 4

| Sample No. | | 11 | 12 | 13 | 14 | 15 |
|---|---|---|---|---|---|---|
| Electrostatic capacity (nF) n = 50 | Average | 998 | 1002 | 1002 | 996 | 1004 |
| | Maximum | 1041 | 1053 | 1056 | 1032 | 1049 |
| | Minimum | 965 | 978 | 973 | 971 | 978 |
| Moisture-loading test, number showing IR decrease per 100 samples | | 5 | 0 | 0 | 0 | 0 |
| Area ratio of plating adhesion | | 100% | 100% | 100% | 100% | 85% |

As is clear from Table 4, Sample Nos. 12 to 14, which contain glass frit in a total amount of about 3–10 wt. % based on the amount of the solid component almost attained the target electrostatic capacity; showed no decrease of insulation resistance in the moisture-loading test; and attained an area ratio of plating adhesion of 100%. Thus, through predetermination of the total amount of glass frit to about 3–10 wt. % based on the amount of the solid component, excellent electric contact between the outer metallized portion and the internal conductor was attained. In addition, no substantial permeation of a plating solution through the outer metallized portion occurred.

In contrast, Sample No. 11, which contains glass frit in a total amount of less than 3 wt. % based on the amount of the solid component, showed a tendency toward decrease of insulation resistance in the moisture-loading test.

Sample No. 15, which contains glass frit in a total amount in excess of 10 wt. % based on the amount of the solid component, showed a tendency to deteriorate plating adhesion.

Other Examples

The present invention has been described hereinabove based on specific examples. However, a variety of other modes for carrying out the invention may also be possible within the scope of the invention.

For example, in the above-described Examples, the outer metallized portion, which serves as a conductive film and was formed from a conductive paste containing copper powder, contains copper, and the internal conductor contains nickel. No particular limitation is imposed on such a combination of metal contained in the conductive paste or outer metallized portion and metal contained in the internal conductor, and a variety of combinations may be adapted so long as the metals combine to form an alloy. In other words, both of the metal contained in the conductive paste or outer metallized portion and the metal contained in the internal conductor are not necessarily base metals as in the above Examples. Alternatively, the combination of a base metal and a noble metal and that of two noble metals may also be employed. Specifically, the outer metallized portion may comprise silver and the internal conductor may comprise palladium.

In addition, in the above-described Examples, the conductive film formed by use of the electrically conductive composition according to the present invention served as an outer metallized portion of a monolithic ceramic capacitor. However, the electrically conductive composition according to the present invention may also be employed for forming a conductive film on an outer surface of the body of other monolithic or non-monolithic ceramic electronic components through firing.

As described hereinabove, the present invention provides an electrically conductive composition containing glass frit, wherein the glass frit comprises a first glass frit which assumes a molten state at least at the maximum temperature during firing and a second glass frit which maintains a glass-ceramic state at the maximum temperature during firing. Thus, drawbacks of an electrically conductive composition containing only first glass frit or second glass frit are eliminated, and the first glass frit and the second glass frit complement each other. The first glass frit provides an effect of promoting sintering of a conductive film and promoting diffusion-bonding of metal in the conductive film and an internal conductor, while the second glass frit provides an effect of inhibiting excessive flow of glass and exudation of the glass to the surface of a conductive film during firing. The two effects are realized in concert.

Thus, according to the present invention, a dense conductive film can be formed through firing, and highly reliable electric contact can be attained between the conductive film and an internal conductor. Furthermore, a plating film can be formed in accordance with need without faults on the conductive film.

The electrically conductive composition according to the present invention is characterized in that the first glass frit has a softening point about 1000° C. or more lower than the maximum temperature during firing; the content of the first glass frit based on the total amount of glass frit lies within the range of about 25–90 wt. %; and the total amount of glass frit based on the total solid components including metal powder contained in the electrically conductive composition lies within the range of about 3–10 wt. %. These features ensure attainment of the above-described effects provided by the first glass frit and the second glass frit.

When metal powder in an electrically conductive composition is formed of copper or silver, or an internal conductor in a monolithic ceramic electronic component which is connected to a conductive film formed from the conductive composition is formed of a base metal, the copper or silver or the base metal is easily oxidized during firing. In such a case, one of the effects of the present invention, i.e., an effect of promoting sintering of a conductive film and promoting diffusion-bonding of a metal in the conductive film and an internal conductor, is particularly notable.

While the invention has been particularly shown and described with reference to preferred embodiments thereof, it will be understood by those skilled in the art that the forgoing and other changes in form and details may be made therein without departing from the spirit of the invention.

What is claimed is:

1. An electrically conductive composition for forming an electrically conductive film through firing, comprising a solid component and a liquid component, wherein the solid component comprises metal powder and glass frit, the glass frit comprises a first glass frit which assumes a molten state at least at a maximum intended temperature during firing and a second glass frit which maintains a glass-ceramic state at the maximum intended temperature during firing;

the first frit has a softening point which is about 100° C. or more lower than the maximum intended temperature during firing;

the content of the first glass frit based on the total amount of the glass frits lies within a range of about 25–90 wt. %; and the total amount of the glass frit based on the total solid component including metal powder lies within the range of about 3–10 wt. %.

2. The electrically conductive composition according to claim 1, wherein the metal powder is at least one selected from the group consisting of copper and silver.

3. The electrically conductive composition according to claim 1, wherein the first frit is Zn—B—Si glass and the second frit is Si—B glass.

4. A ceramic electronic component comprising:

an electronic component body and an electrically conductive film disposed on an outer surface of the body, wherein the electrically conductive film comprises a sintered electrically conductive composition of claim 1.

5. The ceramic electronic component according to claim 4, wherein the metal powder is at least one selected from the group consisting of copper and silver.

6. The ceramic electronic component according to claim 5, wherein an internal conductor is disposed in the electronic component body and electrically connected to the conductive film.

7. The ceramic electronic component according to claim 6, wherein the internal conductor comprises a base metal.

8. The ceramic electronic component according to claim 4, wherein an internal conductor is disposed in the electronic component body and electrically connected to the conductive film.

9. The ceramic electronic component according to claim 8, wherein the internal conductor comprises a base metal.

10. A method for producing a ceramic electronic component having an electronic component body and an electrically conductive film disposed on an outer surface of the body through firing, the method comprising the steps of:

providing the electronic component body;

providing the electrically conductive composition of claim 1 for forming a conductive film;

disposing the electrically conductive composition on an outer surface of the electronic component body; and firing the conductive composition such that the maximum temperature during firing is about 100° C. or more higher than the softening point of the first glass frit and such that the second glass frit maintains a glass-ceramic state at the maximum temperature during firing.

11. The method according to claim 10, wherein an internal conductor is disposed in the electronic component body and partially exposed so as to electrically connected to the electrically conductive film; and the step of disposing the electrically conductive composition includes a step of providing the electrically conductive composition so that the electrically conductive composition contacts the internal conductor.

12. The method according to claim 11, wherein the internal conductor comprises a base metal.

13. A method for producing a ceramic electronic component having an electronic component body and an electrically conductive film disposed on an outer surface of the body through firing, the method comprising the steps of:

providing the electronic component body;

providing the electrically conductive composition of claim 2 for forming a conductive film;

disposing the electrically conductive composition on an outer surface of the electronic component body; and firing the conductive composition such that the maximum temperature during firing is about 100° C. or more higher than the softening point of the first glass frit and such that the second glass frit maintains a glass-ceramic state at the maximum temperature during firing.

14. The method according to claim 13, wherein an internal conductor is disposed in the electronic component body and partially exposed so as to electrically connected to the electrically conductive film; and the step of disposing the electrically conductive composition includes a step of providing the electrically conductive composition so that the electrically conductive composition contacts with the internal conductor.

15. The method according to claim 14, wherein the internal conductor comprises a base metal.

* * * * *